March 22, 1955 T. C. SCHENK Re. 23,968

PACKAGE FORMING AND COOKY ASSEMBLING MACHINE

Original Filed Jan. 31, 1951 7 Sheets-Sheet 1

INVENTOR.
Tarris C. Schenk
BY
H. Lee Helms
ATTORNEY

PACKAGE FORMING AND COOKY ASSEMBLING MACHINE
Original Filed Jan. 31, 1951 7 Sheets-Sheet 2
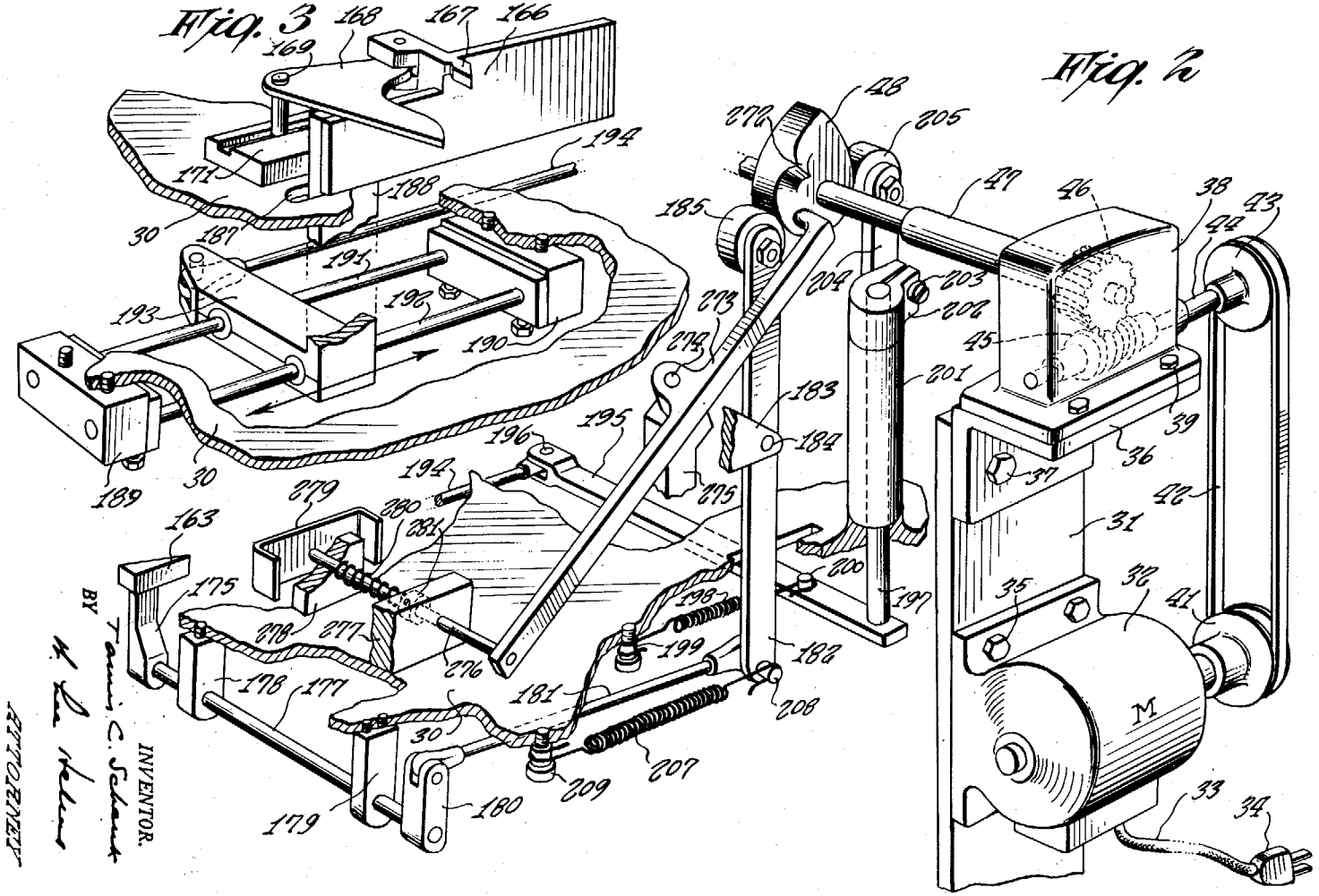

PACKAGE FORMING AND COOKY ASSEMBLING MACHINE
Original Filed Jan. 31, 1951 7 Sheets-Sheet 3
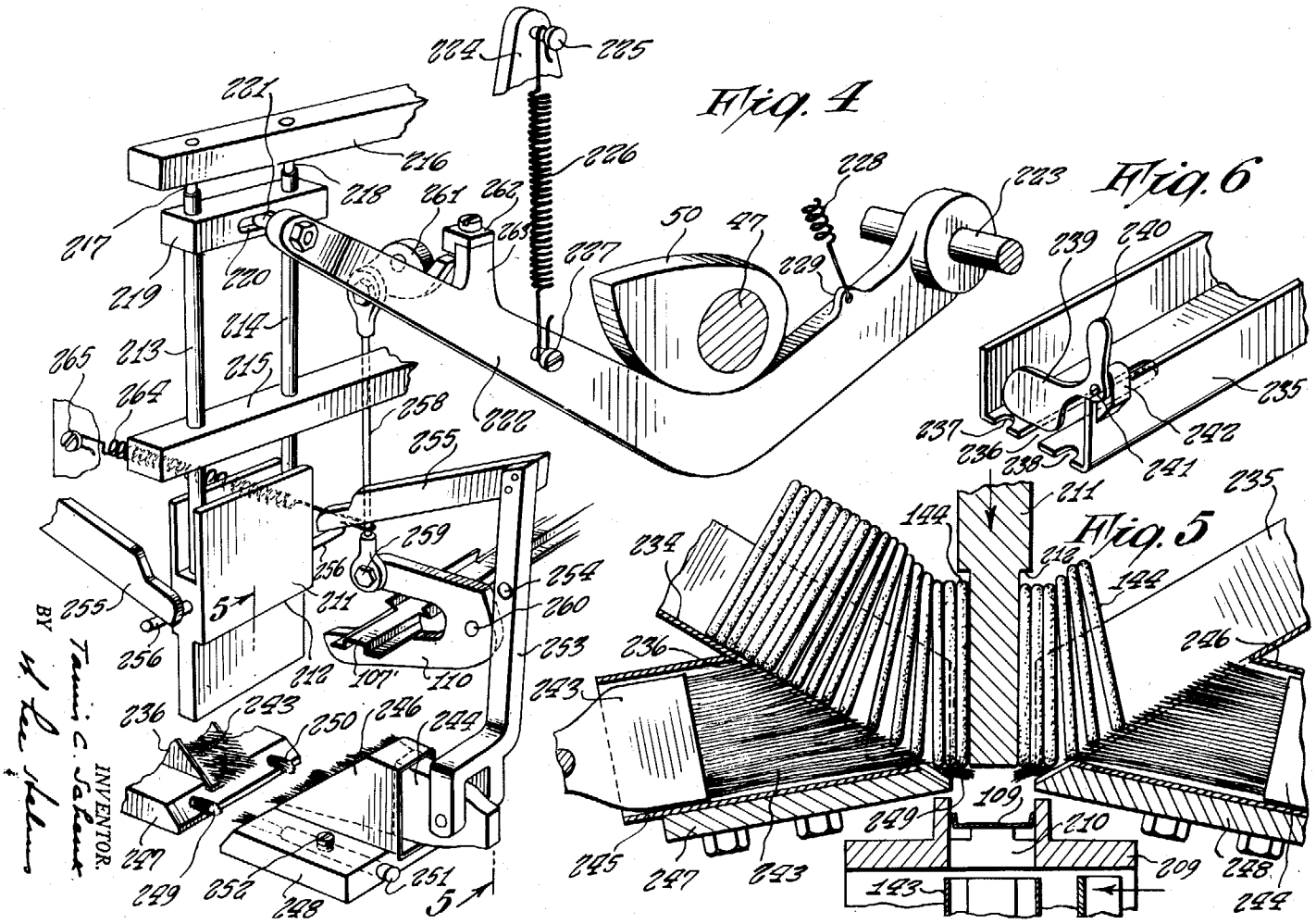

March 22, 1955 T. C. SCHENK Re. 23,968
PACKAGE FORMING AND COOKY ASSEMBLING MACHINE
Original Filed Jan. 31. 1951 7 Sheets-Sheet 4
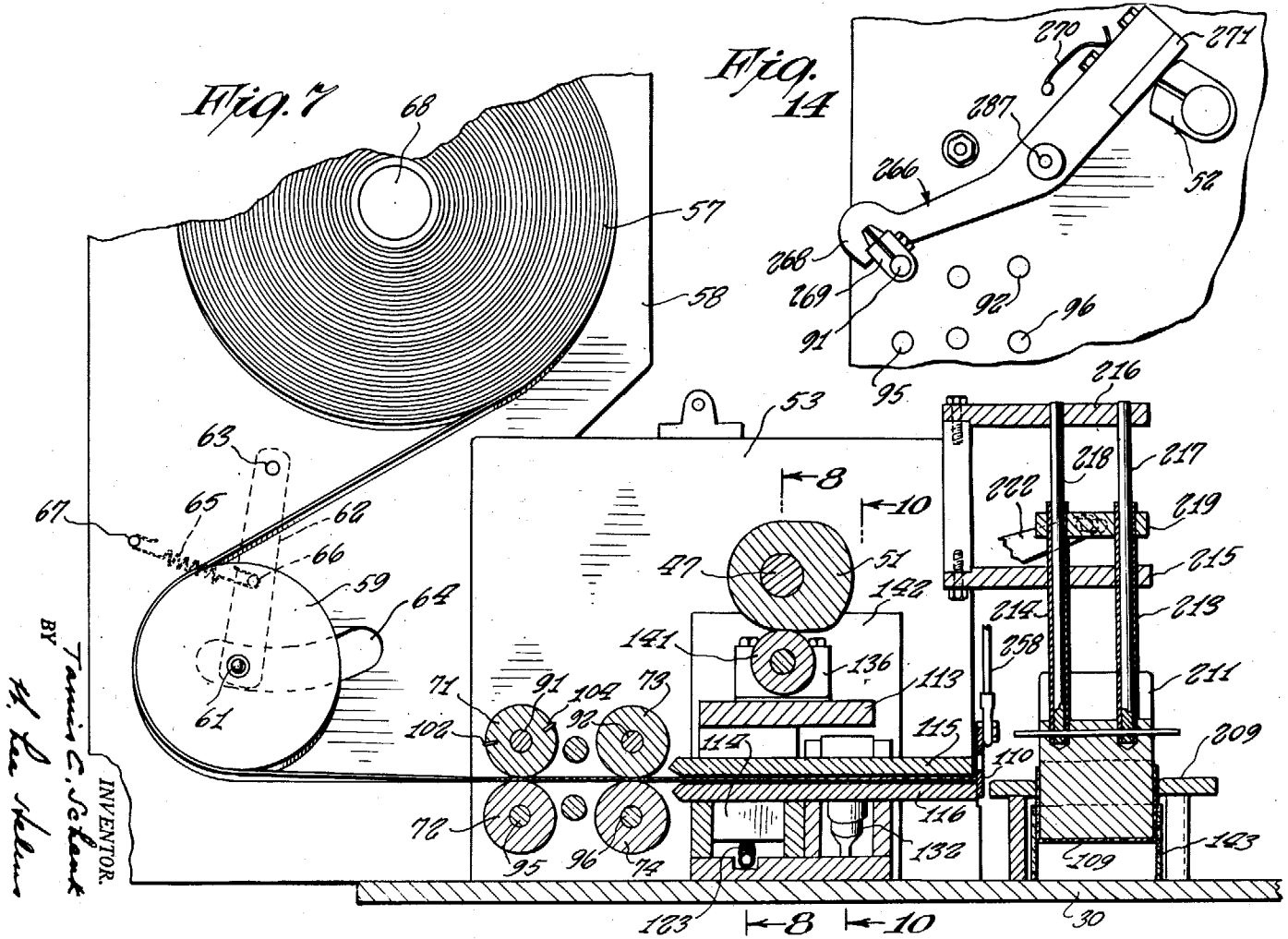

March 22, 1955 T. C. SCHENK Re. 23,968
PACKAGE FORMING AND COOKY ASSEMBLING MACHINE
Original Filed Jan. 31, 1951 7 Sheets-Sheet 5
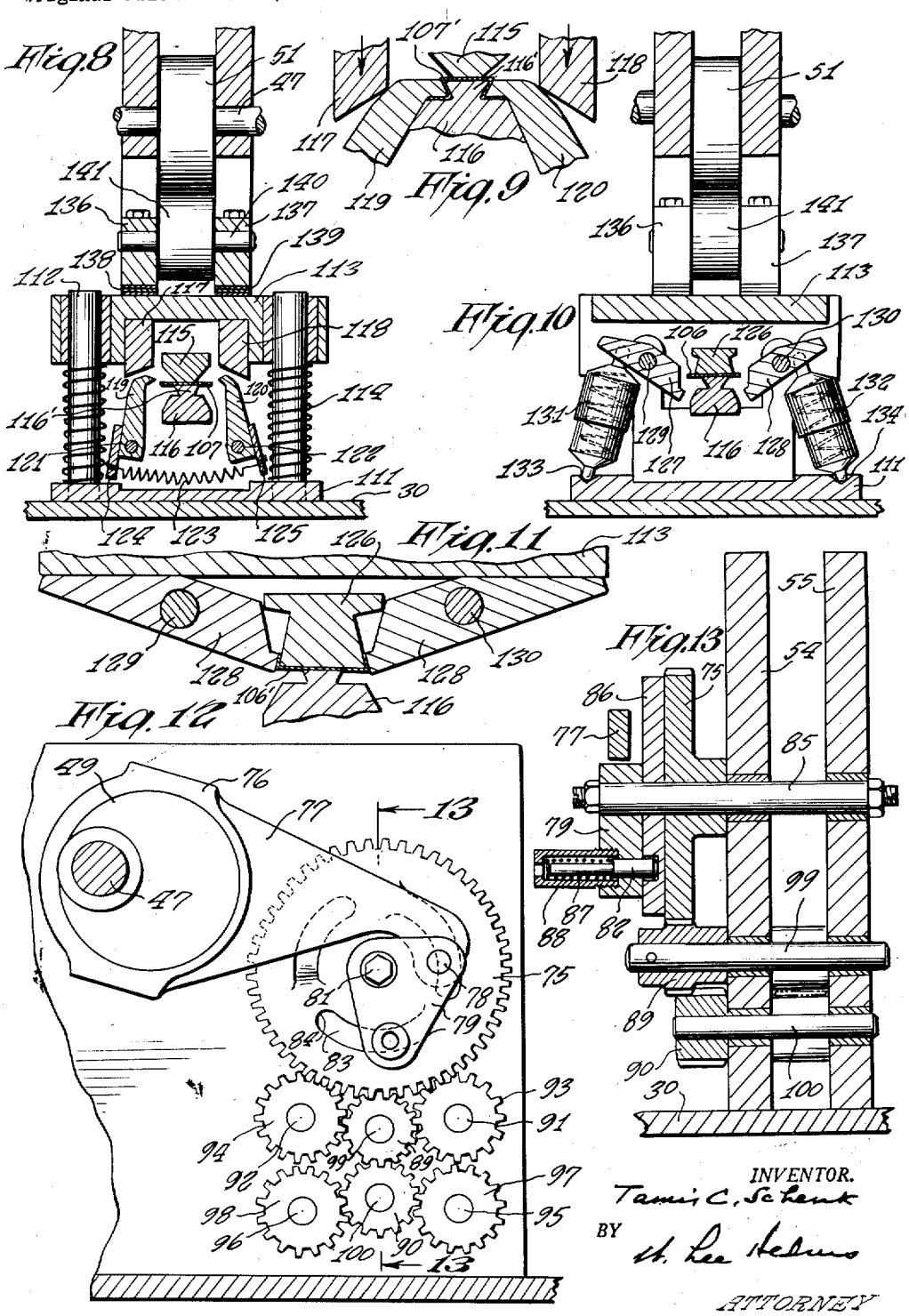
INVENTOR.
Tamis C. Schenk
BY
H. Lee Helms
ATTORNEY

PACKAGE FORMING AND COOKY ASSEMBLING MACHINE

Original Filed Jan. 31, 1951 7 Sheets-Sheet 6

INVENTOR.
Tannis C. Schenk
BY
H. Lee Helms
ATTORNEY

PACKAGE FORMING AND COOKY ASSEMBLING MACHINE
Original Filed Jan. 31, 1951 7 Sheets-Sheet 7
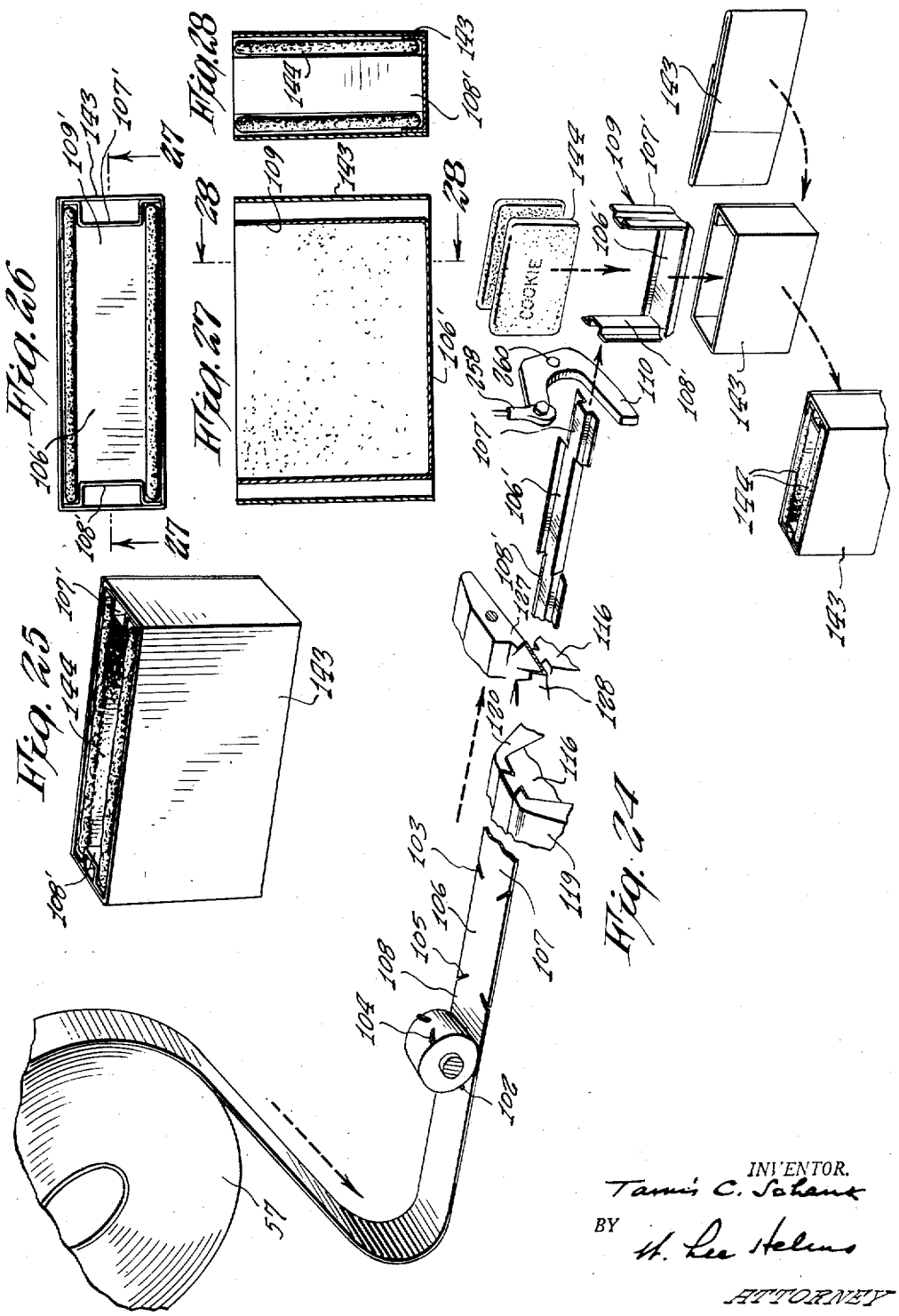
INVENTOR.
Tannis C. Schenk
BY
H. Lee Helms
ATTORNEY United States Patent Office Re. 23,968

Reissued Mar. 22, 1955

23,968

PACKAGE FORMING AND COOKY ASSEMBLING MACHINE

Tamis C. Schenk, Richmond Hill, N. Y., assignor, by mesne assignments, to Burry Biscuit Corporation, Elizabeth, N. J., a corporation of Delaware Original No. 2,616,233, dated November 4, 1952, Serial No. 208,750, January 31, 1951. Application for reissue February 2, 1953, Serial No. 334,769

18 Claims. (Cl. 53—67)

Matter enclosed in heavy brackets [ ] appears in the original patent but forms no part of this reissue specification; matter printed in italics indicates the additions made by reissue.

This invention relates to package forming machines.

It is an object of the present invention to provide an automatic package forming machine for forming and assembling paper parts adapted to receive and retain cookies in spaced relationship and to deliver such (paper) parts with the cookies in condition to receive an ice cream filling or the like to complete the food package.

It is another object of the invention to provide an ice cream sandwich packaging machine [wherein] *in which* paper parts are brought into relationship with one another and assembled along with cookies forming the sides of the sandwich with means for the handling and delivering such cookies into proper parallel relationship on the opposite sides of a press plunger; wherein the cookies will be easily slid downwardly and supported while the plunger is being used to force the cookies into the prepared assembled package [parts] and wherein the [package] *paper* parts are recessed at their ends to hold and retain the cookies in the spaced relationship with which they are delivered to the package [part] *assembly* and wherein such handling of the cookies is effected *for example* with a soft brush operating upon the lower edges of the cookies while supporting the same [and adapted] *so as* to prevent their breakage.

It is another object of the invention to provide a method in assembling packaging parts and spaced cookies to provide an ice cream sandwich wherein the cookies will be retained while being filled with the ice cream filling material and wherein the package parts [serves] *serve* as the form or mold, when taken with the cookies, for receiving and [restraining] *retaining* the ice cream and to provide a simple ice cream package adapted for display and sale to the ultimate consumer *and* wherein the portions of the ice cream sandwich are protected and held in confined relationship until separated from the packaging parts.

It is another object of the invention to provide a novel ice cream package assembly adapted by its package parts to confine and protect the ice cream sandwich.

Other objects of the present invention are to provide an ice cream sandwich packaging machine of the automatic type which is of simple construction, inexpensive to manufacture, has a minimum number of parts, *is* compact and consumes little space, *is* easily supplied with package parts and cookie filling elements, *is* adapted for high speed operation *and is* easy to maintain [and] *aside from being* efficient in operation.

For other objects and for a better understanding of the invention, reference may be had to the following detailed description taken in connection with the accompanying drawing, in which:

Fig. 2 is a fragmentary [and] perspective view of certain of the operating parts of the machine and of the motor and [induction gear] drive arrangement;

Fig. 3 is a fragmentary [and] perspective view of operating [parts] *mechanism* extending beyond the [parts shown] *apparatus* in Fig. 2 and adapted for controlling the supply of *the* package frame [parts] to the assembly point for receiving the inner package [parts] *part* and the cookies;

Fig. 4 is a fragmentary perspective view of the operating [parts] *mechanism* for pressing the package bottom [part] *insert* into the frame part and the devices for receiving and supporting the cookies prior to their insertion into the package [parts] *assembly*;

Fig. 5 is an enlarged fragmentary transverse sectional view taken through the cookie supporting parts and feeding mechanism therefor and generally on line 5—5 of Fig. 4 and [looking] in the direction of the arrows thereof;

Fig. 6 is a fragmentary end view of a cookie chute and of a stop mechanism therefor;

Fig. 7 is a longitudinal sectional view of the machine taken generally on line 7—7 of Fig. 1 and [looking] in the direction of the arrows thereof;

Fig. 8 is a transverse sectional view taken through portions of the paper bottom part forming mechanism and generally on line 8—8 [of Fig. 7] *and in the direction of the arrows as in Fig. 7;*

Fig. 9 is a fragmentary sectional view taken generally on the same line as Fig. 8 is taken, but showing the parts of the machine surrounding the paper part to form it;

Fig. 10 is a fragmentary vertical sectional view taken generally on line 10—10 *and in the direction of the arrows* of Fig. 7 [and] at an advanced station where another portion of the inner package part is formed;

Fig. 11 is a fragmentary sectional view similar to Fig. 10 showing the forming parts disposed upon the paper strip to complete the shape of it;

Fig. 12 is a fragmentary vertical sectional view taken generally on line 12—12 *and in the direction of the arrows* of Fig. 1 and upon the drive gear mechanism for the advancing rollers of the paper strip which is used to form the inner packaging part;

Fig. 13 is a [fragmentary vertical] *transverse* sectional view of the drive mechanism taken on line 13—13 *and in the direction of the arrows* of Fig. 12;

Fig. 14 is a fragmentary elevational view of an operating arm and as viewed on line 14—14 *and in the direction of the arrows* of Fig. 1;

Figure 15:
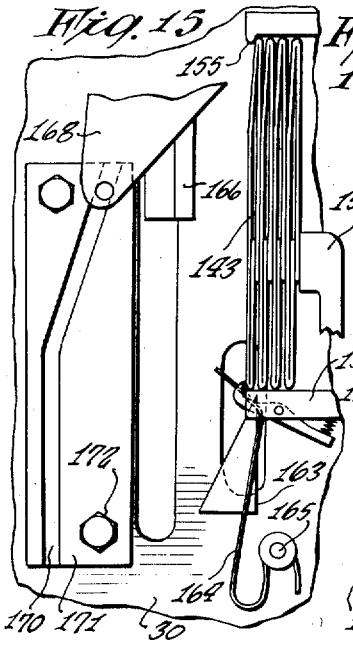
Figure 23:
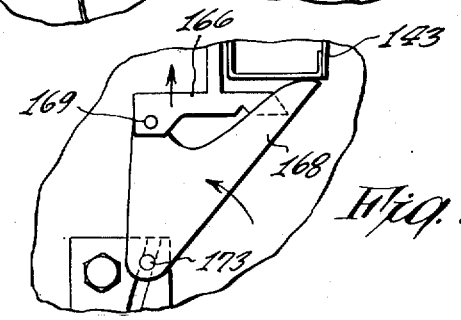

Figs. 15 and 23, inclusive, show fragmentary illustrative views of the package frame part feeding and forming devices at different stages of the feeding and forming of the frame part and of finally lifting the frame part into position to receive the inner packaging part;

Fig. 24 is a fragmentary and diagrammatic perspective view showing the method of assembly of the cookies and the [inner packaging part] *insert* within the frame part;

Fig. 25 is a perspective view of the final package and cookie assembly as it is delivered from the machine;

Fig. 26 is a top plan view looking into the top of the package and from the end in which ice cream material is delivered;

Fig. 27 is a longitudinal sectional view of the final product taken on line 27—27 *and in the direction of the arrows* of Fig. 26; *and*

Fig. 28 is a transverse vertical sectional view of the final product as viewed on line 28—28 *and in the direction of the arrows* of Fig. 27.

Figure 1:
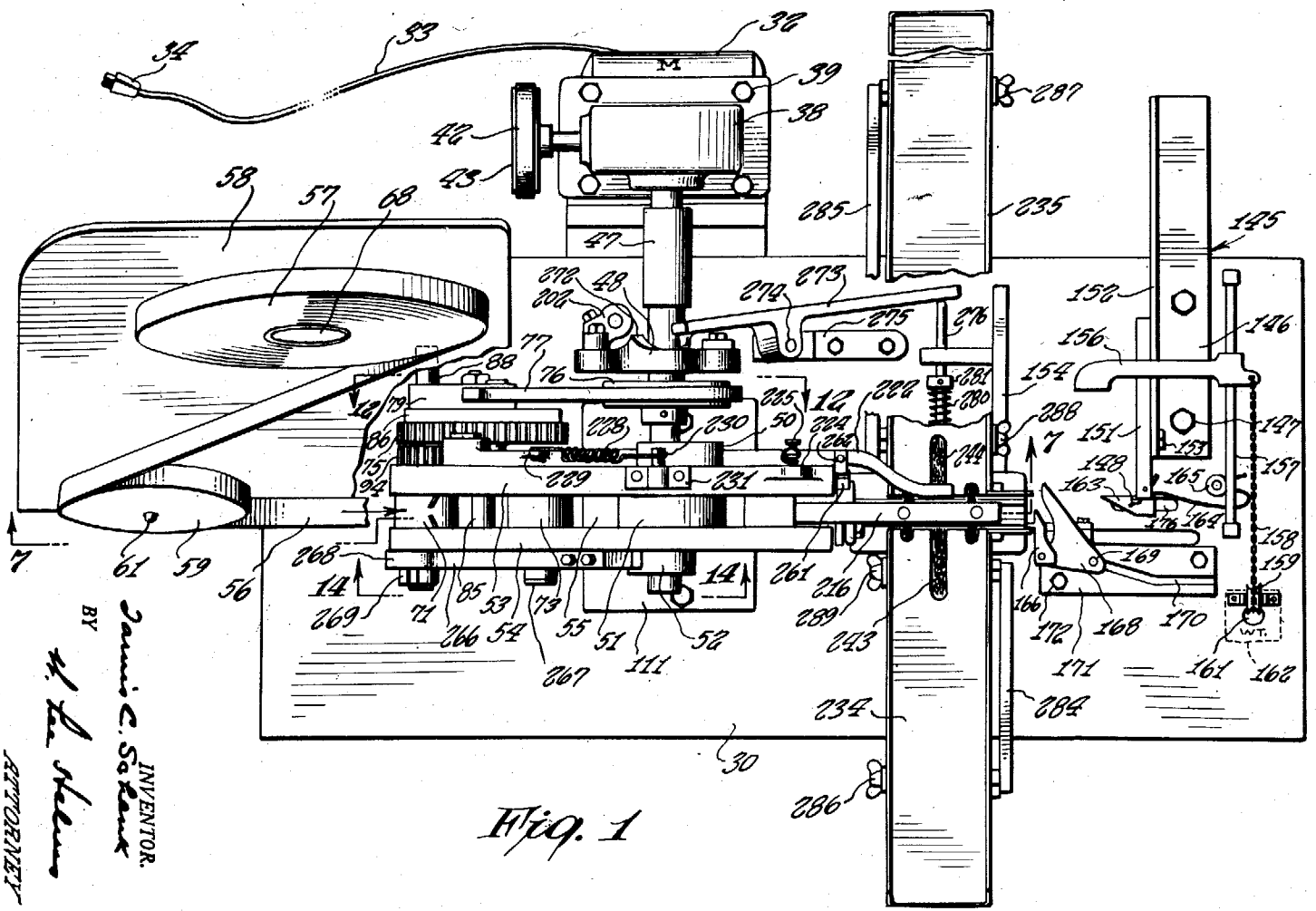
Fig. 1 is a top plan view of the apparatus for forming ice cream sandwich packages constructed according to the present invention.

Referring now to [the] *Figures 1 and 2,* 30 represents a base on which the various mechanisms are assembled. Extending upwardly from the base is a vertical bracket support 31 on which is mounted an electric motor 32 having a cable cord 33 with a plug 34 for connection with a wall receptacle. This motor is secured to the bracket support 31 by bolts 35. Upon the upper end of the bracket support 31 is a shelf bracket 36 secured to the support by bolts 37 and [supporting] *mounting* a reduction gear mechanism 38 that is secured to the bracket member 36 by bolts 39 [, Fig. 2]. The electric motor 32 has a pulley 41 that is connected by a pulley belt 42 with a pulley 43 of the reduction gear mechanism 38. The pulley 43 is connected to an input shaft 44 of the gear mechanism 38 and this shaft has a worm 45 that connects with a worm wheel 46. The worm wheel is connected to an output shaft 47 that has [an] operating cams 48, [a cam] 49, (*Fig. 12*) [a cam] 50, [a cam]

51 and [a cam] 52. These cams are longitudinally spaced from one another on the shaft 47.

Extending upwardly from the base 30 are two transversely spaced parallel guide plates 53 and 54 providing a slot or space 55 through which paper tape 56 is passed and worked to form the [inner] package [part] *insert*. This tape is provided by a tape roll 57 mounted on an upwardly inclined plate support 58 fixed at its lower end to the base 30. Also on the support 58 is an idler and tensioning roll 59 over which the tape extends and is directed to the space 55 between the plates 53 and 54. The idler wheel 59 is pivoted on a pin 61 fixed to an arm 62, Fig. 7, and pivoted at 63 at the opposite side of the support 58. The pin 61 extends through an arcuate and elongated slot 64 so that the arm 62 can lie on the opposite side of the support 58 from the idler pulley 59. A tension spring 65 connects with a pin 66 on the swing arm 62 and is anchored to the inclined vertical support upon pin 67. The spring 65 will keep a tight rearward pull on the portion of the tape which is passed into the space 55. The roll 57 is supported upon pin 68 and will automatically stay in place thereon due to the inclined position of the support 58.

The tape 56 is [forced] *fed* through the space 55 by spaced pairs of driving rollers. The first pair of rollers includes upper and lower rollers 71 and 72, Fig. 7, and the second pair of rollers include upper and lower rollers 73 and 74. On the plate 53 there is journalled a large intermittently rotated gear 75, Figs. 1 and 12, that is operated from cam 49. This cam 49 is in the form of a true eccentric and supports in its ring portion 76 and operating arm 77, the end of which is pivotally connected by a pin 78 to a crank 79 that is pivoted on bolt 81 and which, *as in Fig. 13*, has a spring pressed pin 82 that engages with any of arcuate slots 83 that respectively have closed ends 84, in succession, to step the gear 75 on its pivot connection on the plate 53. A shaft 85 is journalled in the plates 54 and 55, [Fig. 13,] and the gear 75 is secured to [the] *this* shaft. The crank 79 is rotatable upon the shaft and will accordingly be [worked] *rocked* by the arm 77. The detent [end] *pin* 82 is urged toward a wear plate 86 having the slots 83 and fixed to the gear 75 by a compression spring 87 housed within a retaining cup 88 and bearing against the enlarged end of the pin 82.

This gear 75 will intermittently drive pinion gear 89 disposed therebelow and also through this pinion gear there will be driven another pinion gear 90 located [therebelow] *below pinion 89*. The upper driving rollers 71 and 73 are respectively secured to shafts 91 and 92. These shafts in turn respectively have gears 93 and 94 connected thereto. These gears 93 and 94 mesh with the pinion gear 89 to be driven thereby in the same direction.

The lower rollers 72 and 74 are respectively fixed to shafts 95 and 96 that have respectively driving gears 97 and 98 which mesh with the gear 90 to be driven by the same so as to have the upper and lower rollers to act in unison to pull and [force] *feed* the paper tape 56 through the space 55. The driving gears 89 and 90 are respectively fixed to shafts 99 and 100 that extend through the spaced plates 54 and 55 for journal connection therewith. In this manner, the tape will be advanced intermittently through the space 55.

On the roller 71, *Figs. 7 and 24*, are converging cutting projections 102 adapted to notch the sides of the tape at two locations, as indicated at 103, and other cutting projections 104 angled therefrom but converging in a different direction provide notches 105 in the side of the tape. Between the sets of notches there is a length 106 that serves to provide the bottom of the inner package part [and] *or insert* of the assembly [, and]. Portions indicated respectively at 107 and 108 outwardly thereof [serving] *serve* to provide the guide side ends of the upper package part [, Figs. 7 and 24]. The finished upper part is indicated at 108. The formed portions of this upper part 109 are shaped by devices to be presently described and to form portions 106′, 107′ and 108′. The portions 107′ and 108′ are formed at the same time while still connected and are severed by a knife 110. The portions 107′ and 108′ are formed with the parts shown more clearly in Figs. 8 and 9. Upon the base 30 is a plate 111 having upstanding guide posts 112 on which a die plate 113 is supported by compression springs 114. This die plate contains a die member 115 adapted to engage with the top face of portion 107 of the paper tape. This portion is supported by a bottom die 116 having a dovetail formation 116′ thereon about which the portion 107 of the paper tape is to be folded to obtain the final shaped portion 107′ and 108′.

The die plate 113 carries operating members 117 and 118 which have respectively opposing inclined faces engageable with pivotable fingers 119 and 120, respectively, to cause their inward movement over the edges of the tape portion 107 and to force these edges into the cut away sides of the dovetail projection 116′. These finger projections are pivotally supported respectively on pins 121 and 122 in such a manner that they can pivot inwardly at their upper ends and are restrained against this inward pivotal movement by a tension spring 123 connected between extension pieces 124 and 125 of these fingers. These fingers are normally urged to their outward positions, as shown in Fig. 8, by the tension spring 123 and are moved inwardly to assume positions shown in Fig. 9 to finally form the portions 107′ and 108′.

In order to form the bottom portion 106′ from the blank bottom 106 there is provided under the same die plate 113 an arrangement such as shown more clearly in Figs. 10 and 11. The upper contacting member 115 or die is slightly differently shaped, as indicated at 126, to have upwardly converging inclined sides over which the edges of the portion 106 of the tape are folded. Extending respectively at opposite sides of the dies are pivotable fingers 127 and 128 pivoted respectively upon pins 129 and 130 and normally are held downwardly inclined by telescoping spring assemblies 131 and 132 respectively, supported respectively in holes 133 and 134 of the plate 111. As the die plate 113 is moved downwardly, pivot fingers 127 and 128 are engaged at their upper ends and their inner ends are pivoted upwardly to pick up the edges of the portion 106 and wrap them about the inclined edges of the portion 126 of the die or guide member 115 whereby to form the bottom portion 106′ of the upper package part.

On the upper part of the die plate 113 are bearing blocks 136 and 137 supported respectively upon shims 138 and 139 and in which is journalled a shaft 140 carrying a roller 141. This roller is engaged by the cam 51 so that the die plate 113, which forms a part of a unit assembly including the members for working the paper portions 106, 107 and 108 and the base 111 and which project through large openings 142 in the respective laterally spaced vertically extending plates 53 and 54 [.], *is reciprocated*.

With the inner package part 109 already formed, except for the severing of the same from the succeeding parts on the tape and for the bending up of the guide portions 107′ and 108′, an outer package part 143 must be unfolded and positioned to receive the inner part 109 and cookies 144. On the base 30 there is mounted a mechanism 145 serving to retain and release one at a time folded outer package parts 143. This mechanism comprises (*Figs. 1 and 15*) an angle section member 146 secured by bolts 147 to the base plate 30. These parts 143 are held at one end by a small catch 148 biased to an elevated position by a spring 149 and pivoted, as indicated at 150, upon a guide member 151 secured to upstanding flange portion 152 of support member 146 by bolt 153. The opposite end of the folded parts 143 are held by a guide member 154 which has a small lip projection 155 on its end, Figs. 15 to 22. The stack of folded outer parts 143 is advanced and urged toward the catch 148 and the projection 155 by a weighted arm 156 engaging with the end of the stack and slidable along a guide bar 157. A chain 158 connects with the arm 156 and passes over a pulley 159 journalled on a bracket 160 and downwardly through a hole 161 in the base plate 30. On the end of the chain there is fixed a weight 162.

Figure 16:
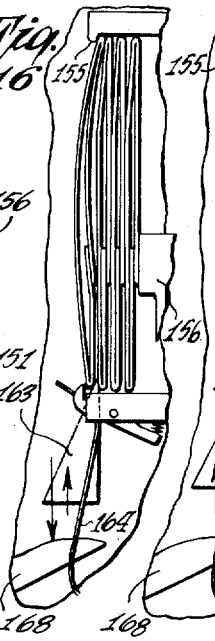
Figure 17:
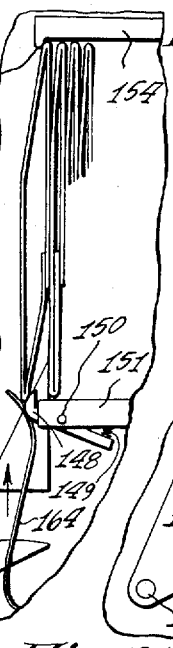
Figure 18:
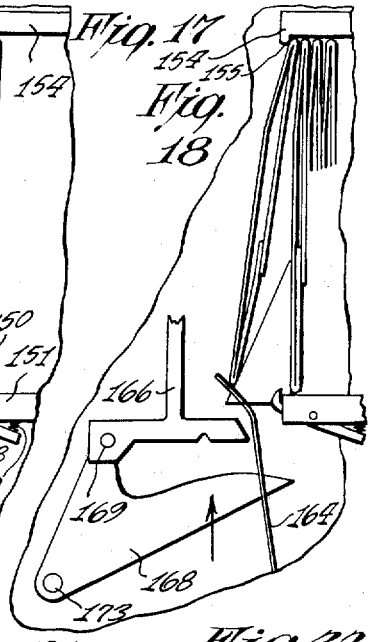

Normally the folded outer parts 143 are held, as shown in Fig. 15. To release the end of the outer packaging parts 143, a triangular-shaped dividing member 163 is urged in the direction of the arrows so that its pointed end will enter between parts 143 and by wedging action separate the parts 143 from the stack and forcibly depress the catch 148 against the action of spring 149, in the manner as shown in Figs. 16 and 17, to lift the end of the frame part over the catch 148. A wire spring finger 164 carried on a post 165 on the base 30 will hold and retain the end of the part 143 upon the side of the wedge 163 until control of the part is assumed by other members.

Figure 19:
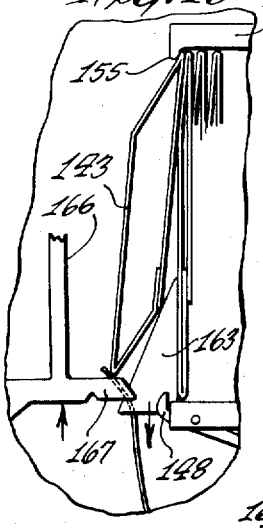
Figure 20:
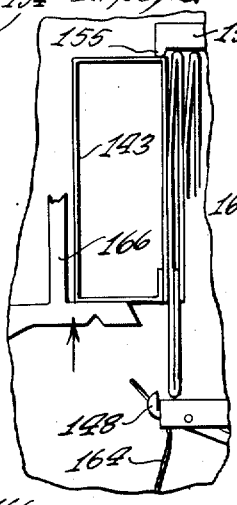
Figure 21:
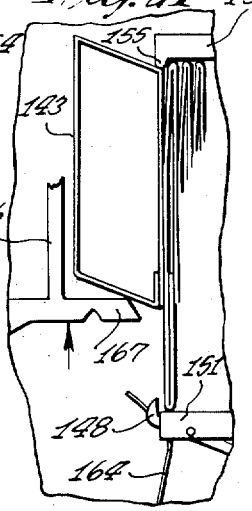
Figure 22:
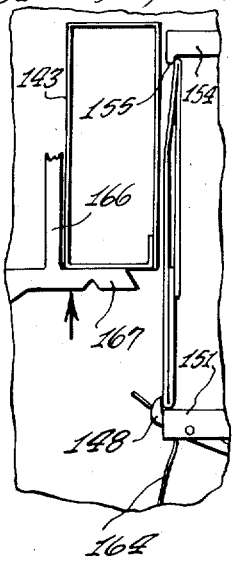

Now that the folded frame part 143 has been released, it next has to be shaped and delivered to a station beneath the upper packaging part 109 and the cookies 144. For this purpose a long member 166 is adjustable longitudinally along the base 30 and has a projection 167 adapted to engage with the end of the folded packaging part 143 and upon its continued movement, as shown in Figs. 19, 20 and 21, will open the part. The projection 155 will continue to hold the part while this forming is being carried on and will restrain it even after the projection 167 has moved it beyond its unfolded open position, in the manner as shown in Fig. 21, so as to give to the part sufficient set so that it will not return to its folded position. Thereafter, the part 143 will release from the projection 155, as shown in Fig. 22, and be delivered to its station beneath the upper part and the cookies. During this movement, a long pivoted finger 168 will engage with the part 143 to stabilize it while being moved by the member 166 and to finally deliver it to its position under the upper part and cookies. This finger 168 is pivotally connected to the forming member 166, as indicated at 169, and is thereby pulled by the member 166. Its pivotal movement is controlled by a cam slot 170 in a cam plate 171 fixed by bolts 172 to the base 30. This cam groove 170 has a bend and a depending pin projection 173 travels in the groove 170, Figs. 1, 15 and 23.

The triangular-shaped member or wedge 163 is operated from cam 48 driven by the drive shaft 47. This wedge 163 is carried on an arm 175, Fig. 2, and this arm projects upwardly from beneath the base plate 30 through an elongated slot 176. Arm 175 is fixed to a shaft 177 extending transversely of the base 30 and journalled in depending brackets 178 and 179. On the opposite end of the shaft 177 is an arm 180 that is connected by a longitudinally extending link 181 to the lower end of a lever 182 which is pivoted on a support 183 at 184 and which has a cam follower 185 on its upper end that engages with the cam 48. The cam 48 is shaped to give the proper timed movement to the wedge 163.

The forming and moving member 166 is also operated by cam 48 and in sequence to the operation of the wedge 163. The same cam surface of the cam 48 which is used for the wedge 163 is used for the member 166, Figs. 2 and 3, and accordingly the wedge and the forming and moving member 166 are operated in sequence.

The member 166 moves along the top surface of the base plate 30. A rigid arm extends from the member 166 through an elongated slot 187 in the base 30 and is slidable therealong. This upright member is indicated at 188. Connected to the underside of the base plate 30 are brackets 189 and 190 which support guide rods 191 and 192 on which travels a slide 193 integrally connected to the upright member 188 which carries the member 166. At one end of the slide 193 there is connected a link 194 that is pivotally connected to a transverse pivot arm 195 at 196. This pivot arm is fixed to a vertically extending shaft 197, Fig. 2. A tension spring 198 is anchored to the under side of the base plate 30 by a bolt 199 and is connected to a pin 200 on the arm 195. The vertically extending shaft 197 is journalled in an upstanding sleeve projection 201 on the upper side of the base plate 30 and has a collar 202 fixed thereto by a screw 203. This collar 202 holds the shaft 197 on the upper end of the sleeve projection 201 against downward displacement. The shaft 197 will be rotated in the sleeve 201 by a projection 204 from the collar 202 and having cam follower 205 bearing against the cam.

A tension spring 207 is connected to a pin 208 on the lower end of vertically extending lever 182 and is anchored to a pin 209 connected to the bottom face of the base plate 30.

The outer package part 143 is, as shown in Fig. 5, finally located under a support 209. This support has a slot 210 for receiving the finally severed upper package part 109 and spaced cookies 144 disposed on opposite sides of a plunger 211 which forces the cookies downwardly with the inner packaging part 109 to fold upwardly the end guide portions 107' and 108' and to force the bottom 106' into the outer packaging part 143. The plunger 211 is shouldered on the opposite sides thereof, as indicated at 212, a distance to receive one cookie or equal to the thickness of the cookie. Due to the shape of the end portions 107' and 108' the cookies will be held in spaced relationship at the opposite sides thereof and provide thereby an opening in the package for receiving the ice cream or other filling upon the finished product being delivered from the present machine.

The plunger 211 is operated by the cam 50 on the shaft 47. Extending upwardly from the plunger 211 are longitudinally spaced guide sleeves 213 and 214 which are slidable through a longitudinally extending member 215. Above the sleeves 213 and 214 there is a frame member 216 having depending rods 217 and 218 respectively for slidably retaining the sleeves 213 and 214. A block 219 is connected between the upper ends of the sleeves 213 and 214. In this block is an elongated slot 220 to which a pin 221 on the end of a long bent arm 222 extends. This arm 222 is pivoted upon a projection or shaft 223 secured to the outer face of the vertically extending supporting plate 53. A boss 224 is provided on the upper edge of the plate 53 to which an anchor pin 225, Fig. 4, is connected. A tension spring 226 is connected to the pin 225 and to a fastening screw 227 on the arm 222. This spring 226 serves to lift the arm 222 and consequently raises the plunger 211. The same spring 226 will maintain the arm 222 against the cam 50 and the cam 50 will operate the arm 222 against the action of the spring 226. A spring 228 is connected to a boss 229 on the arm adjacent the pivot shaft 223 to assist spring 226. The upper end of this spring 228 is connected to a pin 230 projecting from a bracket 231 on the upper edge of the supporting plate 53.

The cookies 144 are [retained] *supported, as in Figs. 5 and 6*, in inclined cookie chutes 234 and 235 provided at their lower ends respectively with a long central slot 236 and two small slots 237 and 238 disposed respectively at the opposite sides of the central slot 236. In order to retain the cookies while the chutes are located in place in the machine, a gate 239 is provided on the end of the chute. This gate has a handle projection 240 and a pivot pin 241 connects this gate with a supporting projection 242 on the side of the chute. Once the chutes are in place the gate 239 is lifted.

These chutes are inclined and in order to straighten the cookies to vertical positions so that they may be received by the plunger 211, [Fig. 5,] brush elements 243 and 244 are used. Guide sleeves 245 and 246 respectively retain the brush elements and the bristles of the brush elements are cut on a bias to enter the large slot 236 of each chute. The brush bristles will act upon the lower edges of the cookies [and cause] to straighten [them] and separate them from one another so that they will be evenly fed to the plunger and prevented from jamming.

The brush sleeves 243 and 246 are respectively supported on inclined plates 247 and 248 and [respectively having] *have* grooves for receiving the sleeves. At the opposite side of each sleeve and in each plate are spaced small brushes 249 and 250 which are respectively carried in handle elements 251 that are made secure to the plates within holes thereof by set screws 252. These brushes 249 and 250 support the cookies 144 above the slot and in alignment therewith until struck by the shoulders 212 of the plunger 211.

To operate the brushes 243 and 244, (*see Fig. 4*) a lever 253 is pivotally connected to some part of the frame at 254 and has a rigidly connected arm extending inwardly from its upper end, as indicated at 255, for engagement by a pin 256 extending from plunger 211 [, Fig. 4]. There is a similar arrangement at each side of the plunger so that the brushes 243 and 244 will be moved inwardly and against the lower edges of the cookies simultaneously with the upward movement of the plunger. The weight of the arms 255 may be sufficient to cause slight retraction of the brush elements for the next inward stroke.

The knife 110 is pivotally connected to a fixed member of the machine and is operated by a link 258 connected at its lower end, as indicated at 259 to the knife 110 to pivot the same about its pivot connection 260. The upper end of the link 258 is connected to a lever 261 pivoted upon the machine frame and engageable by an abutment 262 fixed to an upstanding projection 263 of the arm 222. Every time the arm 222 is moved down the knife 110 is pivoted upwardly to sever the paper tape side portions. The knife 110 accordingly is operated when the plunger is operated and by the same main cam 50 which [operates] *shifts* the arm 222. A tension spring 264 is connected to the link 258 to normally position and retain the knife 110 elevated to permit the movement of the formed paper tape therethrough. This spring is anchored to a fixed part of the machine, as indicated at 265.

While the cutting operation is effected, the paper tape is locked against any play, *as in Fig. 14,* by a device 266 that is operated by cam 52. This lever device 266 is pivoted by a pin 267 upon the vertical support plate 54. The end of the lever has a hook formation 268 adapted to engage with an arm 269 on shaft 91 of the paper driving roll 71. A spring 270 acts upon the lever 266 to urge the same toward the cam 52. The lever 266 has a wear plate 271 for engagement with the cam 52.

In order to effect the adjustment of the final package consisting of inner and outer packaging parts and the cookies, cam 48, *as in Fig. 2,* through its projection 272 on its side face operates a lever 273 pivoted at 274 on a fixed part 275 of the machine frame whereby to push inwardly a rod 276 slidable in blocks 277 and 278 resting on the machine base 30 and having a plunger member 279 adapted to abut the side face of the assembled package so as to move the same out of its position under the opening 210 of the frame 209 and to [make] *provide* room for the making of another assembly. A spring 280 surrounding the rod 276 returns the rod 276 with the plunger plate 279 when the rod 273 is not under the influence of the projection 272 on the face of the cam 48.

The cookie chutes 234 and 235 are respectively supported in their inclined positions by brace rods 284 and 285 held respectively in place by thumb nuts 286 and 287. The lower ends of the brace members 284 and 285 are held respectively by bolt and nut means 288 and 289.

It should now be apparent that there has been provided a package forming machine for forming and assembling outer and inner packaging parts and cookies and wherein the inner packaging part is formed and cut from paper tape passed between spaced vertical plates. It will be further seen that the outer frames are formed and moved into position beneath a plunger which serves to assemble the inner frame or part therewithin along with the cookies and wherein the cookies are provided by removable trays arranged in inclined fashion and adapted to cause the cookies to be advanced respectively to the opposite sides of the plunger and through the engagement with a shoulder thereof they are taken along with the inner packaging part into the outer packaging part.

It will also be seen that the cookies are easily advanced by the use of brushes operating under the lower ends of the inclined cookie chutes to properly cause the cookies to be brought to their vertical positions for engagement with the plunger. It will be further apparent that a single drive shaft having five cams thereon is operable to effect the motions to the various operating parts for performing the several functions.

While various changes may be made in the detail construction, it shall be understood that such changes shall be within the spirit and scope of the present invention as defined by the appended claims.

What is claimed is:

[1. A machine for forming inner and outer packaging parts and assembling the same with cookies comprising means for advancing and forming tape to provide an inner part having a bottom and two side guide portions, means for delivering an outer frame part to a station at which the inner part is delivered, a plunger mechanism lying over the inner and outer parts at their point of assembly, cookie devices for delivering cookies to the opposite sides of said plunger respectively, (and) said plunger being adapted to assemble the cookies and inner part within the outer part and common power means for advancing and forming the inner part, for forming and delivering the outer part and for operating the plunger device.]

2. A machine for forming inner and outer packaging parts and assembling the same with cookies comprising means for advancing and forming tape to provide an inner part having a bottom and two side guide portions, means for delivering an outer frame part to a station at which the inner part is delivered, a plunger mechanism lying over the inner and outer parts at their point of assembly, cookie devices for delivering cookies to the opposite sides of said plunger respectively and said plunger being adapted to assemble the cookies and inner part within the outer part and common power means for advancing and forming the inner part, for forming and delivering the outer part and for operating the plunger device and stack means including an operable catch and a weight adjustable retaining member for retaining a stack of folded outer frames, said means for forming and moving said outer frames to a station for assembly with the inner packaging part comprising a bridge member adapted to separate the [facing] *faces of* one of the folded frames and shaping finger means adapted to pick up the separate folded frame part and to open and compress the same to form the outer frame part and to deliver it for assembly with the inner packaging part.

3. A package part forming and cookie assembling machine comprising a base, vertically extending laterally spaced supports, a paper tape roll extending between the supports, roller means for advancing said tape roll, forming parts within the space between the spaced vertically extending supports for forming an inner packaging part that has a bottom and two side guide portions, the side guide portions being formed upon severance of a common strip lying on the formed tape alternately with the bottom portions, an assembly frame mounted on said base over which the formed inner part is extended, an outer frame packaging part retaining mechanism mounted upon said base, forming and moving mechanism for shaping said outer packaging part and advancing it to the assembly frame, cookie chute means comprising inclined cookie chutes and devices for advancing and straightening the lowermost cookies, a plunger operable over the assembly frame and operable upon said cookies and the inner packaging part to assemble the same with the outer packaging part upon a single downward stroke thereof, and common power means actionable upon the advancing rollers for the tape, the forming parts acting upon the tape, the forming and moving means of the outer packaging part, the plunger and the cookie straightening and moving devices of the cookie chute means.

4. A package forming and cookie assembling machine as defined in claim 3 and knife means for severing the formed inner packaging part operable by the plunger means to sever the side guide portions of the packaging part and said advancing and straightening devices for the cookie chute means operable by the plunger.

5. A package forming and cookie assembling machine as defined in claim 3 and said advancing roller arrangement including rollers arranged in pairs to receive the paper tape and advance the same through the space provided between the vertical supports, said power means including a cam and a reciprocably operable arm, ratchet-like means operable by said arm to be intermittently moved and a large gear operable thereby, gear means extending between the large gear and the roller gears whereby said rollers will be operated in step-by-step fashion to advance the paper tape to the forming devices.

6. A package forming and cookie asembling machine as defined in claim 3 and said advancing roller arrangement including rollers arranged in pairs to receive the paper tape and advance the same through the space provided between the vertical supports, said power means including a cam and a reciprocably operable arm, ratchet-like means operable by said arm to be intermittently moved and a large gear operable thereby, gear means extending between the large gear and the roller gears whereby said rollers will be operated in step-by-step fashion to advance the paper tape to the forming devices, a pivot arm connected to one of the vertical supporting plates for pivotal motion, one of the paper tape advancing rollers having an extension and a small lock arm thereon, said pivot arm having a formation adapted to grasp said latch arm of the roller and said power means including a cam operable upon the pivotable latch arm in timed relation to hold said advancing roller arrangement while the severance of the inner packaging part is being effected with the knife device and the assembly is being effected with the plunger device.

7. A packaging part forming and cookie assembling machine as defined in claim 3 and said vertically extending plates having vertical recesses therein and the forming elements for the paper tape being disposed on a base and removable through said vertical spaces in the vertically extending supports whereby said forming elements for the paper tape may be removed as a unit from within the vertically extending supports and *said power means including a cam disposed between the vertically extending supports and* rotatable therein and engageable with the tape forming parts of the unit assembly thereof.

8. A packaging part forming and cookie assembling machine as defined in claim 3 and said means for separating said outer packaging parts from the retaining mechanism and moving the same to the assembly frame comprising a wedge element operable to separate one of the outer packaging parts from the stack and longitudinally movable relative to said base and a finger forming and moving arrangement adapted to pick up the outer frame part from the wedge part, said common power means including a common cam and linkages operable by said cam and extending respectively to said wedge part and said finger forming and moving part.

9. A packaging part forming and cookie assembling machine as defined in claim 3 and said means for separating said outer packaging parts from the retaining mechanism and moving the same to the assembly frame comprising a wedge element operable to separate one of the outer packaging parts from the stack and longitudinally movable relative to said base and a finger forming and moving arrangement adapted to pick up the outer frame part from the wedge part, said common power means including a common cam and linkages operable by said cam and extending respectively to said wedge part and said finger forming and moving part, an ejecting device operable to remove the finished packaging assembly from beneath the assembly frame and including a pivotal lever, said cam for operating the wedge and forming parts of the outer packaging part having a cam projection on the side thereof engageable with said lever for the ejecting device whereby to operate the same in timed relation with the wedge and forming elements of the outer packaging part.

10. A packaging part forming and assembling machine as defined in claim 3 and ejector means for removing the package assembly from the assembling frame and said ejecting means operable by said common power means and in timed relation with respect to the operating plunger to remove the package assembly as the plunger is lifted.

11. In a device for forming inner and outer packaging parts and assembling cookies therewith, means for forming the inner part and advancing the same to an assembly station, means for delivering cookies to the assembly station to a position above the inner packaging part and means for retaining a stack of folded outer packaging parts including a latch element and a keeper device for urging the stack of outer packaging parts toward the latch, a wedge element operable between the outer packaging part and the next inner one acting upon the latch to sever the same from the latch, a shaping element adapted to engage the released edge of the outer packaging part to cause the same to be expanded and to move it to the assembly station beneath the inner packaging part and the cookies and a plunger operable upon the cookies and inner part to assemble the same within the outer packaging part.

12. In a device for forming inner and outer packaging parts and assembling cookies therewith, means for forming the inner part and advancing the same to an assembly station, means fer delivering cookies to the assembly station to a position above the inner packaging part and means for retaining a stack of folded outer packaging parts including a latch element and a keeper device for urging the stack of outer packaging parts toward the latch, a wedge element operable between the outer packaging part and the next inner one acting upon the latch to sever the same from the latch, a shaping element adapted to engage the released edge of the outer packaging part to cause the same to be expanded and to move it to the assembly station beneath the inner packaging part and the cookies and a plunger operable upon the cookies and inner part to assemble the same within the outer packaging part, ejecting means extendible under the assembly frame to eject the assembled package and common cam means for operating said wedging and forming elements for the outer packaging part and the ejecting means.

13. An apparatus for forming an inner packaging part having a bottom and two folded up side guide end portions, comprising a base, vertically extending spaced supporting plates laterally spaced from one another, tape advancing rolls lying between said plates, means for intermittently driving said rolls to feed paper tape, one of said rolls having cutting elements thereon to provide spaced pairs of fold assisting notches on the paper tape, a forming device actionable upon one portion to fold up the sides thereof whereby to provide the bottom portion of the packaging part and another device operating simultaneously with said bottom forming device to form the side end potrions of the packaging part, knife means for severing the side end portions and a plunger operable upon the bottom portion to bend up the side end portions and thereby form the inner packaging part and a frame assembly under the plunger working in conjunction therewith to so shape finally the inner packaging part.

14. An apparatus for forming an inner packaging part having a bottom and two folded up side guide end portions comprising a base, vertically extending spaced supporting plates laterally spaced from one another, tape advancing rolls lying between said plates, means for intermittently driving said rolls to feed paper tape, one of said rolls having cutting elements thereon to provide spaced pairs of fold assisting notches on the paper tape, a forming device actionable upon one portion to fold up the sides thereof whereby to provide the bottom portion of the packaging part and another device operating simultaneously with said bottom forming device to form the side end portions of the packaging part, knife means for severing the side end portions and a plunger operable upon the bottom portion to bend up the side end portions and thereby form the inner packaging part and a frame assembly under the plunger working in conjunction therewith to so shape finally the inner packaging part, said vertical supports having cut away openings and a sub base carrying said forming devices for the portions of the packaging part.

15. An apparatus for forming an inner packaging part having a bottom and two folded up side guide end portions comprising a base, vertically extending spaced supporting plates laterally spaced from one another, tape advancing rolls lying between said plates, means for intermittently driving said rolls to feed paper tape, one of said rolls having cutting elements thereon to provide spaced pairs of fold assisting notches on the paper tape, a forming device actionable upon one portion to fold up the sides thereof whereby to provide the bottom portion of the packaging part and another device operating simultaneously with said bottom forming device to form the side end portions of the packaging part, knife means for severing the side end portions and a plunger operable upon the bottom portion to bend up the side end portions and thereby form the inner packaging part and a frame assembly under the plunger working in conjunction therewith to so shape finally the inner packaging part, one of said rollers having an extension thereon and a latch arm fixed to said extension, a pivot lever pivotally connected to one of said vertical supports and having a hook formation adapted to extend over the latch arm of the roller whereby to retain the same against rotation while the knife means is being operated and while the inner packaging part is being formed, said roller being also further retained while said portions of the tape are being formed by said forming devices.

*16. A machine for providing a receptacle at least one inner face of which is defined by an edible layer and the interior of which is to be filled with a substance—which together with said layer—will provide an edible unit, said machine comprising in combination, means receiving a folded outer enclosing package part, means providing and shaping an inner package part, means unfolding said outer enclosing package part, means delivering said edible layer to said inner package part and disposing both the latter and said layer within said unfolded enclosing part and said shaping means including mechanism for so forming said inner package part that said part retains said layer adjacent an inner face of said enclosing part and thereby provides space between said layer and an opposite face of said enclosing part to receive a mass of edible substance.*

*17. A machine for providing a receptacle the opposite faces of which are defined by edible layers and the interior of which is to be filled with a substance—which together with said layers—will provide an edible unit, said machine comprising in combination means receiving an outer enclosing package part, means for supplying tape, means shaping said tape to provide integral guiding and retaining structures, means shaping said tape to include a bottom portion and an end portion, and to thus furnish an inner package part, means delivering a pair of said edible layers to said inner package part and disposing both the latter and said layers within said enclosing*

*package part and means forming a part of said delivery means to arrange said edible layers within said guiding structures to be retained thereby adjacent opposite inner faces of said enclosing part and in spaced relationship such that they may receive between them a mass of edible substance.*

*18. A machine for providing a receptacle the opposite faces of which are defined by an edible layer and the interior of which is to be filled with a substance—which together with said layers—will provide an edible unit, said machine comprising in combination, means receiving a folded outer enclosing package part, means for supplying tape, means shaping said tape to provide integral guiding and retaining structures, means shaping and severing said tape to provide a bottom portion and an end portion and to thus furnish an inner package part, means unfolding an enclosing package part, means delivering a pair of said edible layers to said inner package part and disposing both the latter and said layers within said unfolded enclosing package part and means forming a part of said delivery means to arrange said edible layers within said guiding structure to be retained thereby adjacent opposite inner faces of said enclosing part and in spaced relationship such that they may receive between them a mass of edible substance.*

*19. A machine for providing a receptacle, having edible layers and between which there is to be received a substance which, together with said layers, will provide an*

*edible unit, said machine comprising in combination, means receiving an outer enclosing package part, means providing an inner package part formed with guiding and retaining structures for the purpose of holding edible parts in spaced relation, means delivering a pair of said edible layers to said inner package part and disposing both the latter and said layers within said enclosing package part whereby said edible layers within said guiding structures are retained in spaced relationship such that they may receive between them a mass of edible substance.*

References Cited in the file of this patent or the original patent

| | | |
|---|---|---|
| 787,100 | Lazaga | Apr. 11, 1905 |
| 998,936 | Tucker | July 25, 1911 |
| 1,309,122 | Escobales | July 8, 1919 |
| 1,473,496 | Molins | Nov. 6, 1923 |
| 1,627,853 | Kuhn | May 10, 1927 |
| 1,832,065 | Voigt | Nov. 17, 1931 |
| 1,935,613 | Bronander | Nov. 21, 1933 |
| 1,938,482 | Chalmers | Dec. 5, 1933 |
| 2,248,651 | Von Lossberg | July 8, 1941 |
| 2,255,251 | Zuyer | Sept. 9, 1941 |
| 2,521,403 | Overland | Sept. 5, 1950 |
| 2,591,812 | Henderson | Apr. 8, 1952 |
| 2,630,389 | Lipshutz | Mar. 3, 1952 |